United States Patent [19]
Shah

[11] Patent Number: 6,100,638
[45] Date of Patent: Aug. 8, 2000

[54] KIT FOR CONVERTING LIGHTING UNITS EMPLOYING FLUORESCENT LAMPS FROM INDUCTIVE OPERATION TO ELECTRONIC OPERATION

[75] Inventor: Suresh H. Shah, Mumbal, India

[73] Assignee: Asian Electronics Limited, Thane, India

[21] Appl. No.: 09/271,480

[22] Filed: Mar. 17, 1999

[30] Foreign Application Priority Data

Jan. 12, 1999 [DE] Germany ............................ 199 00 889

[51] Int. Cl.[7] .................................................. H01J 7/44
[52] U.S. Cl. .................... 315/59; 315/70; 315/209 R; 362/217; 439/232
[58] Field of Search .................... 315/57, 59, 70, 315/209 R, DIG. 1; 362/217, 221, 260; 439/56, 232, 235–237

[56] References Cited

U.S. PATENT DOCUMENTS 3,673,402   6/1972   Weiss ................................ 240/51.11 R

*Primary Examiner*—Haissa Philogene
*Attorney, Agent, or Firm*—Marshall, O'Toole, Gerstein, Murray & Borun

[57] ABSTRACT

A kit for converting a fluorescent lighting unit from inductive operation to electronic operation (using a high frequency ballast). The kit comprises a pair of sleeve-like adaptors which are adapted to be mounted at the ends of a straight fluorescent lighting tube, and a wiring assembly for electrically connecting the adapters. The components forming the electronic ballast can be mounted in one or both of the adapters, or can be mounted in the wiring assembly.

10 Claims, 2 Drawing Sheets

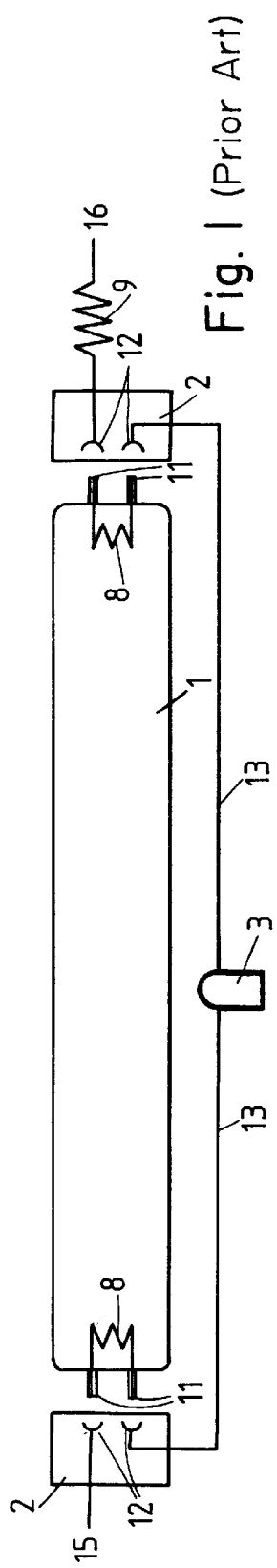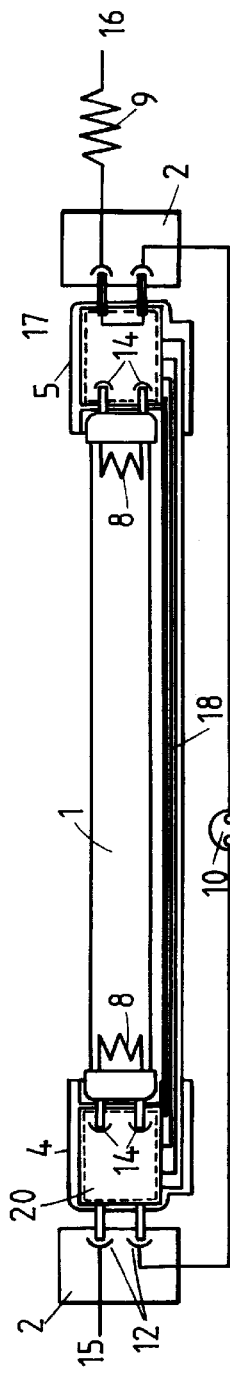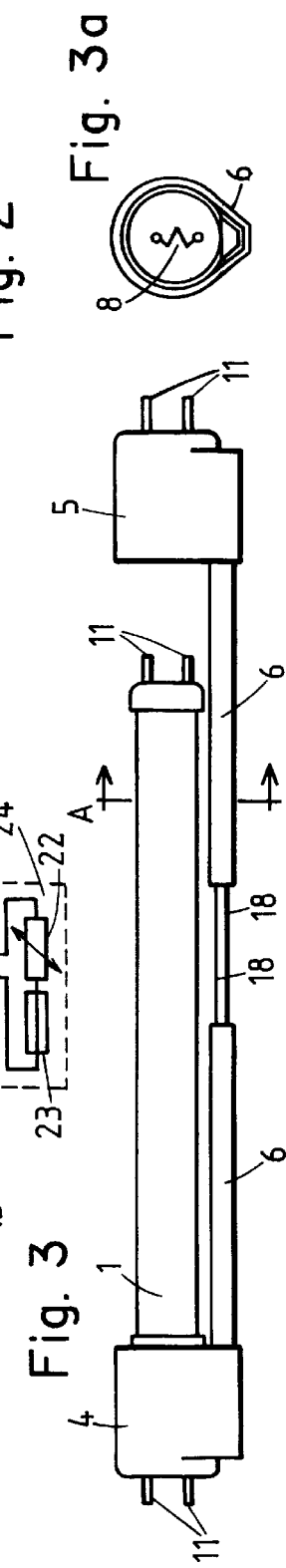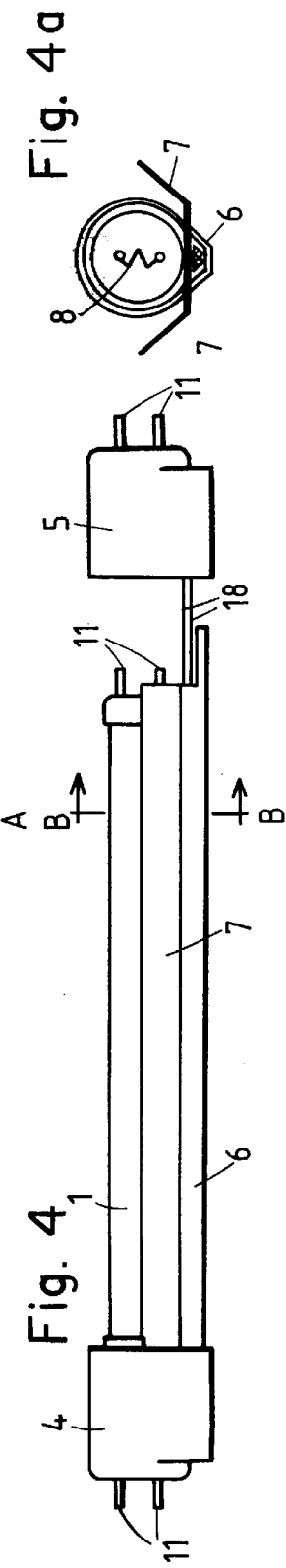

KIT FOR CONVERTING LIGHTING UNITS EMPLOYING FLUORESCENT LAMPS FROM INDUCTIVE OPERATION TO ELECTRONIC OPERATION

BACKGROUND OF THE INVENTION

The type of lighting that is most widespread worldwide is the straight fluorescent lamp, with electrical contacts on both sides, which can be found today in all offices, factories, hospitals, etc. Although in the course of the last ten years it has been determined that the operation of these gas discharge lamps, which employ simple chokes in order to limit the current of the gas discharge, is not the optimum solution, uncounted millions of lamps of this type are in use today.

The disadvantages consist in that in the operation of lamps at the customary power frequency of 50 or 60 Hz, the light flickers at this frequency and stroboscopic effects can occur, which, for example, cause running machines to appear to be stopped. Also, the efficiency of these "inductive" fluorescent lamp ballasts is not satisfactory. The efficiency of the physical conversion of the at first invisible gas discharge into visible light can be considerably improved by a modern electronic device operating at high frequency. For equivalent light efficiency, a significant energy savings can be obtained in the process. This is not only a cost factor, but also an obligation in preserving natural resources and the environment.

Of course, the conversion of inductive lamps to electronic high frequency operation is not only a question of the cost of a fluorescent lamp ballast; although such a conversion may be viewed as technically and economically advisable, the expense in installation work associated with such a change prevents a rapid conversion.

SUMMARY OF THE INVENTION

The purpose of the present invention is to provide a simple and cost-effective solution which makes possible the replacement of fluorescent lamps in existing lighting units while simultaneously converting to electronic high-frequency operation, in a cost effective manner and with minimal or no installation work.

This is achieved by providing a kit in which the structural components of the electronic ballast can be housed in a single adapter, or divided into two adapters, which can be attached on the ends of the gas discharge tubes. This results in only a slight enlargement of the overall length of the fluorescent lamp, which, given the modern miniaturization of electronic components, can be achieved without difficulties.

In order to prevent a rebuilding of the lighting units and change of the wiring inside the lighting units, it is further proposed to arrange the electrical connections necessary for a flawless function between the two adapters, attachable to the greatest extent possible on the adapters and covered in a cable channel.

Another variation of the invention provides for housing the structural components of the electronic ballast either only in the cable channel or housing parts of them in the adapters.

According to the invention, it is also proposed that on the cable channel, reflector wings are arranged which not only reinforce the cable channel, but also with minimal added costs, introduce a considerable improvement in the re-radiation of light. One additional advantage of housing the electronic ballast in the cable channel is that additional cooling of the structural components can be achieved through the reflector wings.

Since this involves a retrofitting kit, a savings can be achieved in at least one connection line between the adapters. In lieu of an added electrical wire or line, the connection lines to the starter holder—always present in lighting units with inductive systems—can be utilized as an element of the circuit. Instead of the starter, an additional bypass adapter is used in the starter holder The bypass adapter shunts the connections of the starter holder, either with a fuse, a temperature-dependent PTC resistor, or a combination thereof, and thus creates an electrical connection between the adapters. The combination of a fuse with a PTC resistor is preferred.

Since the length of the fluorescent lamps is established as a worldwide standard, it is further proposed according to the invention, to design the length of the adapters in such a way that the length of the fluorescent lamps, including the adapters, corresponds to standard lengths, and thus the fluorescent lamps with adapters according to the invention can readily be inserted into existing standardized lamp sockets or lighting fixtures.

BRIEF DESCRIPTION OF THE DRAWINGS

The following detailed description of the invention is supported by the schematically described embodiment examples, which function only for better understanding and are to be evaluated in no way as a restriction of the range of protection of the invention.

FIG. 1 shows for better understanding as an example, a traditional arrangement with a choke (9) as the inductive ballast;

FIG. 2 depicts the design of a shortened fluorescent lamp according to the invention, having two additional adapters (4) and (5) set on the ends which contain the structural components of the electronic ballast (20);

FIG. 3 shows a view of a construction according to the invention in which the fluorescent lamp has already been installed in the left adapter, however, the right adapter has not yet been placed. The line channel is divided in the middle and connected to the adapters;

FIG. 3a shows a section A—A of FIG. 3;

FIG. 4 shows a view of an alternative solution, however, with a line channel, which is provided with two reflector wings and arranged between the adapters;

FIG. 4a shows a section B—B of FIG. 4;

DETAILED DESCRIPTION OF A PREFERRED EMBODIMENT

Figure 5:
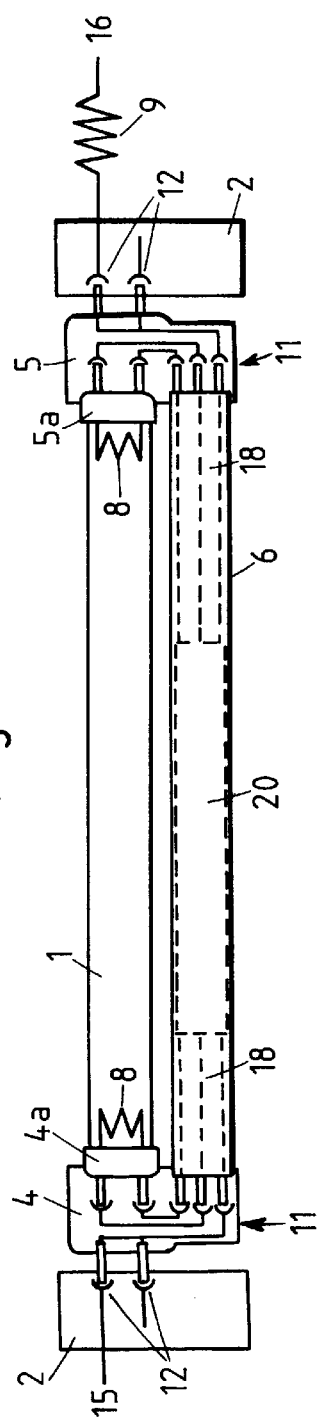
FIG. 5 shows a variation of the invention in which the electronic ballast is arranged in the line channel (6)

The following detailed schematic description functions for the understanding of the invention concept, however, it can not depict this exhaustively since uncounted construction variations both in the design, as well as in the functional construction, are possible.

First, a traditional lamp is depicted in FIG. 1, having a fluorescent lamp (1) of the type used until now, which is inserted in two brackets (2) and has its current limited inductively by a choke (9). A so-called "starter" (3) provides for a surge to cause the ignition of the gas discharge, only after a certain pre-heating time of the electrodes (8). The fluorescent lamp (1), with its heated electrodes (8), is supplied with voltage from a power network (15) or (16) via spring-finger contacts (12) and contact pins (11). The starter (3) is connected to the electrodes (8) via lines (13). When a lamp is switched-on, and power is first supplied to the lamp circuit, starter (3) supplies a higher heating current to the electrodes (8) in order to facilitate the subsequent ignition operation of the gas discharge. The time delay is accomplished mostly by use of a heated bimetallic strip whose function is not reliable. In electronic ballast devices, pre-heating is controlled by electronic circuits and thus considerably more reliable.

Referring now to FIGS. 2 and 5, examples of designs according to the invention are described schematically: Fluorescent lamp (1) has a pair of sockets (4a) and (5a) which are attached to adapters (4) and (5) in brackets (2) on each side of a lighting unit. Contact pins (11) and allocated, recessed internal spring-finger contacts (14) provide for the electrical connection of electrodes (8) of the fluorescent lamp (1) with the adapters (4) and (5), or with the spring-finger contacts (12) in the sockets (2).

The adapters (4) and (5) are connected to each other through connection lines (18) which, as depicted in FIG. 5, lie in a line channel (6). The structural components of an electronic ballast (20) can either be provided within adapter (4) only, or parts of the ballast can reside in adapter (5).

In order to save a connection line (18), wires or lines (13) that are always installed in the existing lighting units can be used in order to supply the power voltage (16). An electrical pathway is provided through the elastic contacts (12) of the right bracket (2), via the starter holder, to the left bracket (2) and thus to the ballast (20) in the adapter (4). To accomplish this, it is only necessary to by-pass the contacts of the starter holder (10).

The by-pass of the contacts of the starter holder (10) does not occur in an ill-considered manner with a shorting clamp, but instead via a protective resistor (22) or via a fuse (23) which are housed in a by-pass adapter (24), which can be inserted into a starter holder (10). Use of a temperature-dependent PTC resistor as protective resistor (22) has the advantage of limiting the inrush current; however, this type of resistor consumes power constantly and in case of an electrical disturbance, no switch-off occurs. A fuse (23) in holder (10) provides complete safety; however fuse (10) does not limit the making (switch-on) current. In some cases, a combination of both functions can be desired, as depicted by the series connection of resistor (22) and fuse (23) in FIG. 2. Since this involves a simple, inexpensive structural component as an accessory, all desires can be selectively met according to the invention and applied exchangeably as desired.

Of course, it is at first not known which spring-finger contacts (14) conduct the power supply voltage in the bracket and which lead to the starter through the lines (13). Since the voltage from the power network (16) must be supplied to the ballast (20) and in this way to the fluorescent lamp (1), and because the starter (3) is no longer necessary, the two contact pins (11) located on the right adapter (5) can readily be connected with a shorting bar (17), and in this way the required connection from the power network (16) is reliably achieved via the by-pass adapter (24) to the ballast (20) in the adapter (4).

If it is desired to not use the existing lines of the lighting unit and the starter holder (10), the problem of supplying power to ballast (20) can also be solved with an additional connection line (18) between the adapters (4) and (5).

The choke (9), connected in series with the power network (16), has no special effect on the electronic operation of the lamp; it can even cause an additional contribution to disturbance of the function. If desired, it can removed or by-passed.

FIG. 3 is a view of a complete kit, with fluorescent lamp (1) already inserted into the adapter (4), but before the placement of the adapter (5). For this purpose, the centrally divided halves of the line channel (6) are not yet plugged together and the two connection lines (18) can still be seen. Both parts of the line channel (6) could, of course, also slide into each other in a telescoping manner in order to allow a simpler handling. After the plugging in of the adapter (5) on the contact pins (11) of the fluorescent lamp (1), the entire unit can be inserted into the brackets (2) of the lighting unit and the lighting unit is thus converted to electronic operation. In the example of FIG. 3, the parts of the line channel (6) are firmly connected to the adapters (4) or (5), which should be taken into account in manufacturing of the parts from plastic.

The variation of FIG. 4 shows an undivided line channel (6) which is, moreover, provided with reflector surfaces (7) and thus gains considerably in stability. In the section B—B in FIG. 4a, this can be clearly recognized. In FIG. 4, the right adapter (5) is also not yet placed and here as well, the two connection lines (18) are seen.

If one wishes to further economize the assembly, the embodiments of FIG. 5 to FIG. 8 may be appropriate. The embodiment schematically shown in FIG. 5 is particularly simple in construction and east to manufacture.

In the embodiment of FIG. 5, all parts of the electronic ballast are housed in the line channel (6), which are adapted to mate with contact pins (11) in the adapters (4) and (5), on both sides. All parts of FIG. 5 are provided with the same reference numbers and have the same functions as described in the other drawings.

Figure 6:
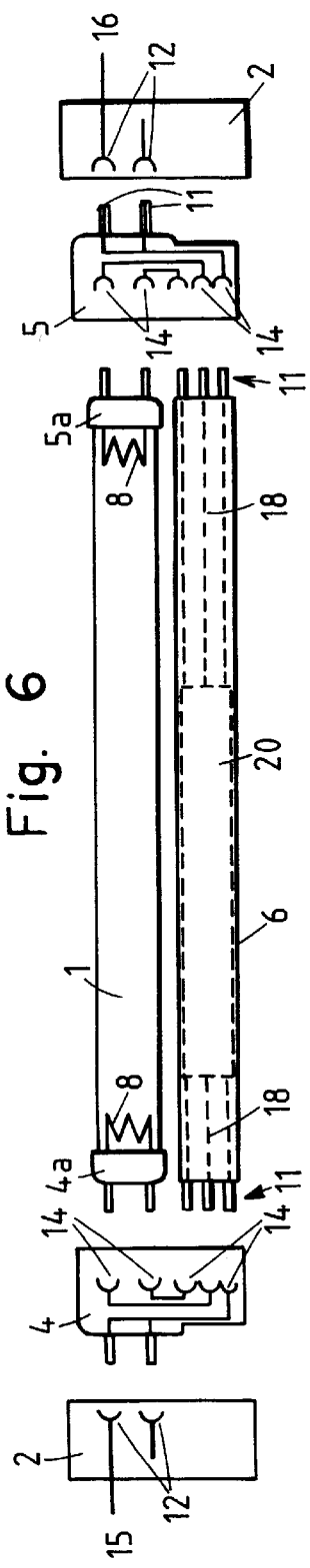
FIG. 6 is an exploded view of the apparatus of FIG. 5 which shows the separate parts of the kit prior to the assembly.
Figure 7:
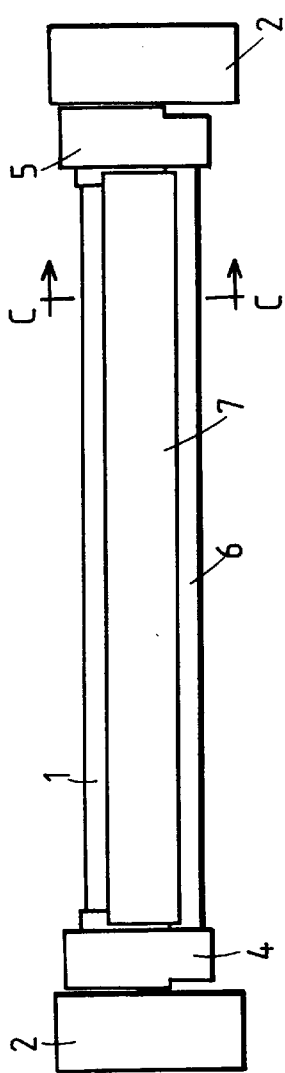
FIG. 7 is a schematic representation of the apparatus of FIGS. 5 and 6.
Figure 8:
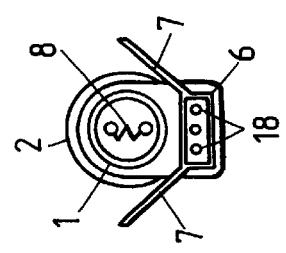
FIG. 8 shows a section C—C of FIG. 7.

FIG. 6 depicts both the fluorescent lamp (1) as well as the adapters (4) and (5) before being assembled, in order to better show the individual parts. The extremely simple design can be seen clearly here. One additional advantage is that the electronic ballast (20) can be adapted to different operating voltages and outputs, simply by replacing the line channel (6). No loose wires, no screws or other connecting mechanisms are necessary. The complete kit, shown in assembled condition in FIG. 7, can be applied in any antiquated lighting unit having an inductive ballast, and brings the advantages mentioned at the beginning.

What is claimed is:

1. A kit for converting a fluorescent lighting fixture from inductive operation to electronic operation, said lighting fixture comprising a pair of spaced brackets for holding a fluorescent lamp, each of said spaced brackets having a pair of spring-finger contacts for operatively connecting a lamp mounted in the lighting fixture to a power network, said kit comprising:

a) first and second socket adapters, each said socket adapter containing:
i) a pair of pins extending outwardly from a surface of said adapter, said pins adapted to mate with the spring-finger contacts on one of said lighting fixture brackets;
ii) a pair of recessed spring contacts, said recessed contacts mounted on a surface of said adapter which is opposite to the surface containing said adapter pins; and iii) electrical connections between said adapter pins and said adapter recessed spring contacts;

b) a shorting bar in at least one of said socket adapters, said shorting bar electrically interconnecting said adapter pins;

c) an electronic ballast having structural parts in at least one of said socket adapters;

d) a line channel having a length which is less than the distance between said lighting fixture brackets, said line channel extending between said first and second socket adapters, said line channel containing at least a pair of wires which electrically connect the interior of the first socket adapter to the interior of the second socket adapter; and e) a fluorescent lamp adapted to fit between said first and second socket adapters when said adapters are mounted in said spaced brackets.

2. A kit in accordance with claim 1 wherein said line channel comprises two telescoping elements.

3. A kit in accordance with claim 1 wherein said line channel has a plurality of outwardly-extending contact pins at each end of said channel, and said first and second adapters have internal contacts for mating with said channel contact pins.

4. A kit according to claim 1 wherein the line channel is integral with said first and second socket adapters.

5. A kit according to claim 1 wherein said line channel comprises an extruded plastic tube.

6. A kit according to claim 1 wherein said line channel has an exterior surface for reflecting light emitted from said lamp.

7. A kit according to claim 1 wherein said fluorescent lighting fixture contains a fixture line which electrically connects a spring-finger contact on one of the spaced brackets to a spring-finger connector on the other spaced bracket, the improvement comprising:

a by-pass adapter comprising a protective resistor and a fuse mounted, in series, in said fixture line.

8. The kit of claim 7 wherein said resistor comprises a PTC resistor.

9. A kit according to claim 7, wherein said fixture line passes through a starter holder, and said by-pass adapter is adapted to be mounted in said starter holder.

10. A kit according to claim 1 wherein said electronic ballast is mounted in said first socket adapter.

* * * * *